Oct. 20, 1942.     J. R. C. QUILTER     2,299,407
PARACHUTE PACK
Filed April 4, 1940
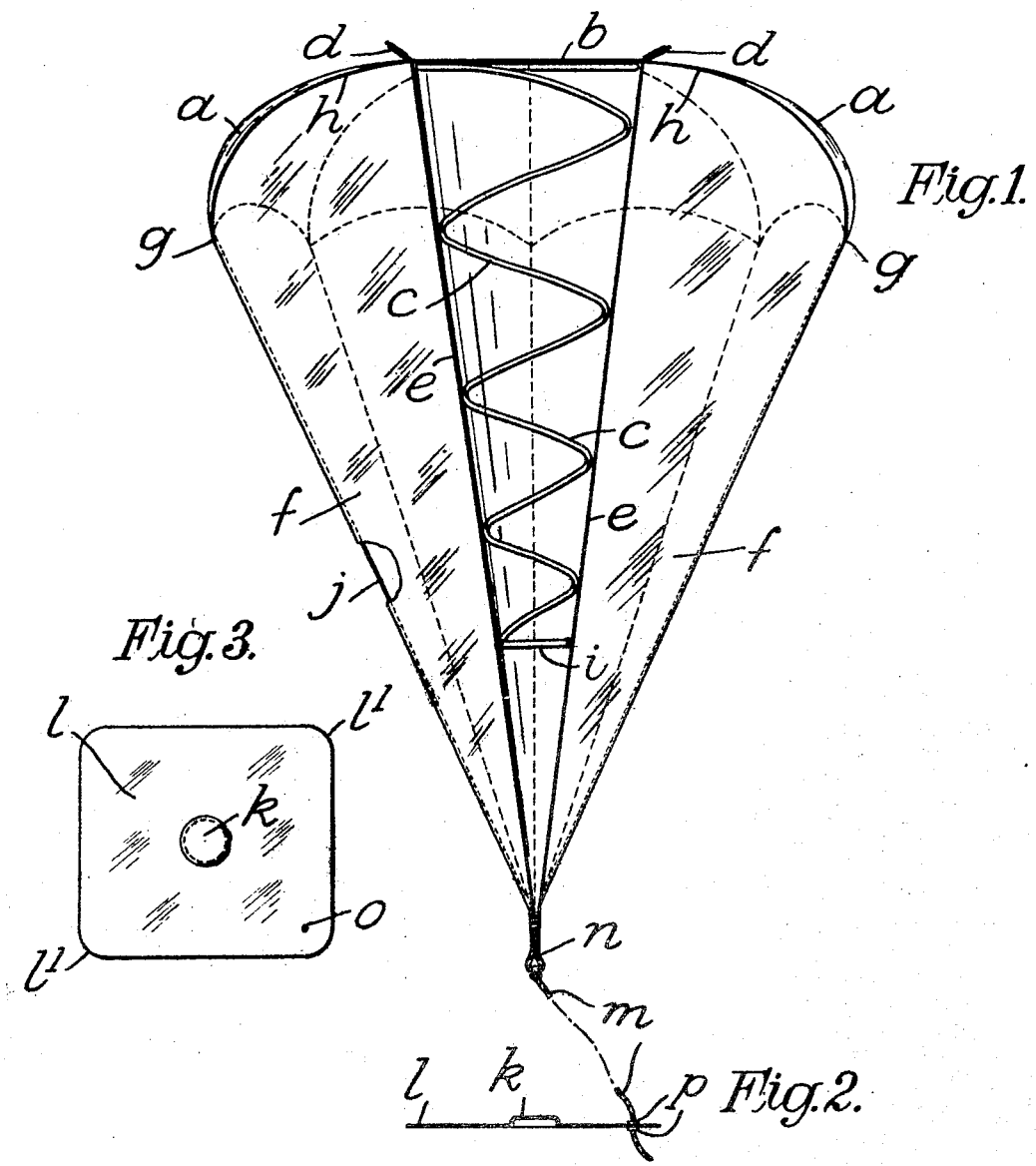
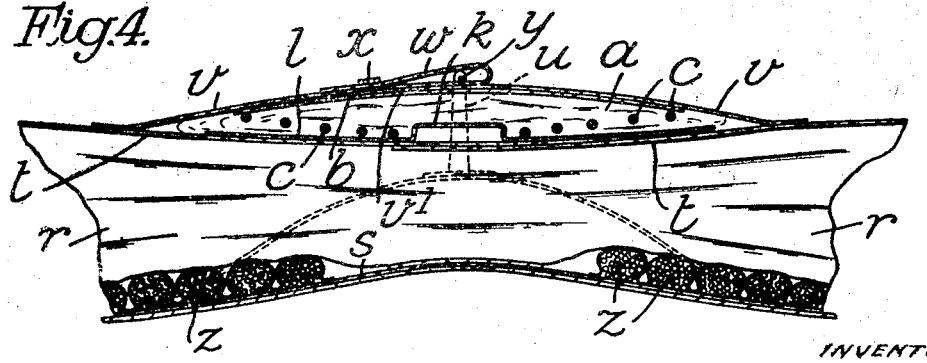
INVENTOR
JOHN R.C. QUILTER Patented Oct. 20, 1942

2,299,407

UNITED STATES PATENT OFFICE 2,299,407

PARACHUTE PACK

John Raymond Cuthbert Quilter, Woking, England

Application April 4, 1940, Serial No. 327,885
In Great Britain October 10, 1939

3 Claims. (Cl. 244—149)

This invention relates to parachute packs and more particularly to arrangements in which folded parachutes are stowed in the backs of aviators' flying suits or like garments, for example as described in pending application Serial No. 312,786 filed January 6, 1940.

The invention has for its main object to provide an improved pack having a separator interposed between main and pilot parachutes in order to distribute the pressure or "kick" exerted by the spring which tends to open the pilot parachute so that this pressure shall not cause discomfort during the wear of the garment.

Another object of the invention is to provide a kicker-board or separator with means for locating the separator in relation to the parachute opening spring so that the parts will be held from slipping out of place until the release of the pack by the usual rip-cord or equivalent.

Other objects and advantages of the invention will appear from the subsequent description of a preferred embodiment of the invention, as illustrated in the accompanying drawing, in which:

Fig. 1 is a sectional view of a pilot parachute in the deployed state, showing the spring extended.

Fig. 2 is a sectional view of the kicker-board or separator.

Fig. 3 is a front view of the kicker-board.

Fig. 4 is a sectional view on a larger scale, showing the parachute in folded state, with the spring collapsed and pressing against the kicker board, the whole being stowed in a space at the back of a flying suit such as described in the pending application Serial No. 312,786 mentioned above.

As shown in Fig. 1, the pilot parachute $a$ is provided with a flat circular top panel $b$, made for example of linen, to the circumference of which there is attached the larger end of a conical spiral spring $c$; the panel $b$ is provided with a pair of eyeletted tabs or grommet flaps $d$ at diametrically opposite points of the top spring coil, which is seamed or stitched to the panel $b$. The body of the spring $c$ is enclosed in a conical bag or stocking $e$ from which radial vanes $f$ extend to the periphery $g$ and dome $h$ of the canopy, the outer edges of these vanes enclosing the rigging lines $j$.

The smaller end $i$ of the spring, to which the bag $e$ and the inner edges of the vanes $f$ may be attached in any suitable manner, for example by stitching around the end coil of the spring, is arranged to encircle a shallow circular boss or stepped area $k$ at the center of a substantially rectangular separator or kicker board $l$ shown in Figs. 2 and 3; this board is provided with rounded corners $l^1$ and its sides are preferably somewhat longer than the diameter of the larger end of the spring $c$. In the collapsed position, shown in Fig. 4, the spring $c$ rests approximately flat against the kicker board $l$ with the pilot parachute $a$ folded around it; the cord $m$, connected to the rigging line loop $n$ of the pilot parachute passes through a hole $o$ at one corner of the board, this cord being preferably fitted with rubber rings $p$, sleeves or the like between which the board $l$ is gripped, so as to ensure the withdrawal of the board by the outward movement of the cord in order that it shall not interfere with the release of the main parachute which is connected to the other end of the cord.

The kicker board $l$ is conveniently made of multi-ply linen or the like embedded in a synthetic resin material, being for example about 9 inches square and from $\frac{3}{16}$ to $\frac{1}{16}$ of an inch thick, with a central boss $k$ about 2 inches in diameter raised one-quarter of an inch from its outer face, and a corresponding depression on the opposite face.

The main parachute $r$, which is stowed in any preferred manner, for example as described in the above mentioned pending application, with its shroud lines $z$ engaged upon a base $s$ fitted within the space provided at the back of the flying suit or the like, is covered by a pair of main closure flaps $t$ extending from the sides of the garment and having eyelets at their meeting edges, which overlap upon two locking cones or studs $u$ projecting from the base. The kicker board $l$ is placed over these flaps $t$ and fits loosely between the cones, but the pilot parachute $a$ stowed behind the board is engaged with the same cones by means of the eyeletted tabs $d$ projecting from diametrically opposite points of its top panel $b$. Two external lateral flaps $v$, attached to the main closure flaps $t$ of the flying suit or the like, are made large enough to cover the stowed kicker board $l$ and pilot parachute $a$, one flap having a plain edge $v^1$ with two eyelets for engaging the locking cones $u$; the other flap (which rests over the first) is provided also with a pair of eyelets positioned for engagement with the cones $u$, but has an extension $w$ which can be folded back over the tops of the cones, the free edge of this extension being fitted with one member of a sliding clasp fastener $x$, of which the other member is mounted upon the body of the same flap $v$.

The rip-cord, which may be enclosed in a tubular seam or housing upon one of the main closure flaps $t$, as described in the above mentioned pending application, has its inner wire forked at a point near the top of the small external flaps, one of the forked wires $y$ being engaged in each of the apertured cones $u$ after the stowing of the parachutes and before the extension $w$ of the outer flap is fastened.

Upon operation of the rip-cord, the coiled spring $c$ opens out the pilot parachute $a$, pushing the external flaps $v$ off the locking cones; the pilot parachute then draws out the connecting cord $m$ carrying the kicker board $l$ and by means of this cord pulls out the main parachute $r$ with the shroud lines $z$ from between the inner or main closure flaps $t$, the deployment of the main parachute then taking place in the usual manner after it has been drawn out into the airstream.

What I claim is:

1. In a parachute pack, the combination of a main parachute, a pilot parachute, a tensile member connecting said main and pilot parachutes, a compression spring having one end attached to the canopy of said pilot parachute and the other end connected to said tensile member, and a separator positioned upon said tensile member at a point distant from said connected spring end, said separator being interposed between said other end of said spring and said main parachute in the stowed condition of said parachutes.

2. In a parachute pack comprising main and pilot parachutes, a tensile member connecting said main and pilot parachutes, and a compression spring attached to said pilot parachute, said spring being compressed between said main and pilot parachutes in the stowed condition of said parachutes, a separator consisting of an eccentrically apertured plate, said plate being positioned upon said tensile member with its aperture slidably engaged by said tensile member and being interposed between said spring and said main parachute in the stowed condition of said parachutes.

3. In a parachute pack, the combination of a main parachute, a pilot parachute, a tensile member connecting said main and pilot parachutes, a compression spring having one end attached to the canopy of said pilot parachute and the other end connected to said tensile member, and a separator positioned upon said tensile member at a point distant from said connected spring end, said separator being freely interposed between said main and pilot parachutes to receive the force of said spring in the stowed condition of said parachutes and being lifted from said main parachute independently of said spring by said tensile member after the deployment of said pilot parachute.

JOHN RAYMOND CUTHBERT QUILTER.